WILLIAM F. GUNKEL
INVENTOR

BY Killman and Kerst
ATTORNEYS

MULTIPLE CONTROL FOR ASYNCHRONOUS MULTIVIBRATORS

Filed Jan. 21, 1958

WILLIAM F. GUNKEL
INVENTOR

BY
Kellman and Kerst
ATTORNEYS

United States Patent Office 2,941,096
Patented June 14, 1960

2,941,096

MULTIPLE CONTROL FOR ASYNCHRONOUS MULTIVIBRATORS

William F. Gunkel, Baltimore, Md., assignor to Bendix Aviation Corporation, Towson, Md., a corporation of Delaware Filed Jan. 21, 1958, Ser. No. 710,290

4 Claims. (Cl. 307—88.5)

This invention relates to means for controlling at a single point the duration of the output pulses of a plurality of asynchronous multivibrators.

The change of state of a multivibrator is generally timed by the exponential decline of potential across a capacitor to a transition level, as shown in Fig. 1 of the accompanying drawings, the potential change being the result of dissipation of stored energy by way of an exponentially changing current through a resistive conducting path across the capacitor. Alternatively, the timing may be accomplished by an inductor shunted by the resistive path, and the transition may be referred to a critical level of current rather than a critical level of potential, but all cases of interest here have this in common: an initial change of state of the multivibrator (which may be either spontaneous or triggered) alters the current through a timing circuit composed of a reactor shunted by a resistive conducting path, whereupon the timing circuit proceeds by an exponential time pattern to a new state of equilibrium but passes a transition level before attaining substantial equilibrium and thereupon reverts to the original state of the multivibrator.

If all other conditions in a given circuit remain fixed, the time between the first and second changes of state will be directly proportional to the product of the values of the reactor and the resistors composing the timing circuit, and may be altered by varying either or both values. Likewise, the time may be altered by changing the transition level, which provides a convenient method of altering a time interval through a moderate range in response to changes in a controlling potential, and is widely practiced, as for example, in the horizontal sweep circuits of practically all designs of television receivers. Its convenience resides in the ease of controlling the transition level by altering the bias on a control electrode of an amplifier used in the multivibrator.

For two reasons, this method of relating a timed operation to a control potential may not be useful, since the timed period is an exponential function wherein the exponent is inversely related to the difference between two potentials. Hence, first, the relation between the period and the control potential may fit over only a very small range, and second, the difference between the potentials need not become very small to be subject to marked disturbance by their normal variations. A third reason applied only to common control of two or more asynchronous multivibrators, where a strong tendency toward synchronous operation will arise from the minute high-frequency pulses conveyed from each to the others over the control circuit. This tendency is most marked where the multivibrators are of the monostable form and are sequentially triggered at the same rate.

The novel form of control described herein provides for greater flexibility in relating the timed period to the control potential, reduces the disturbances due to normal variations of supply potentials and practically eliminates the tendency to auto-synchronism.

It is an object of the present invention to provide a circuit by means of which the duration of the output pulses of a plurality of multivibrators may be controlled simultaneously by the manipulation of a single control element, without danger of auto-synchronism.

It is a further object of the invention to provide means for increasing the range of output pulse duration through which a multivibrator may accurately be controlled.

These and other objects and advantages of the invention are realized in a circuit in which the normal resistive discharge path for the reactive storage element of a multivibrator interstage coupling circuit is shunted by a network comprising a series arrangement of a diode, a resistor and a variable source of direct current.

Figure 1:
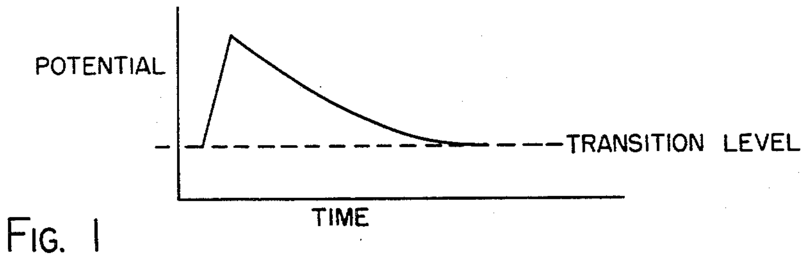
Fig. 1 is a graph showing the discharge curve of a reactive storage element of a multivibrator through the conventional discharge path.
Figure 2:
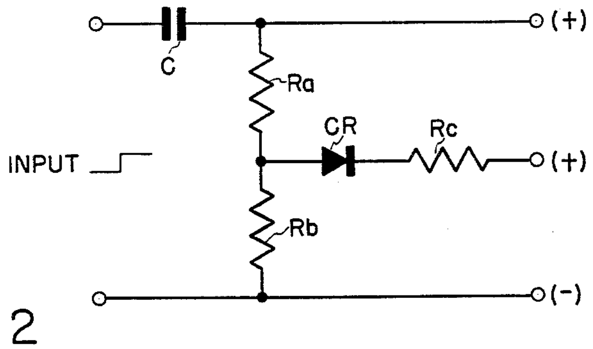
Fig. 2 is a schematic diagram of the timing circuit of a multivibrator, showing the application thereto of a control circuit conforming to the invention.

Referring more particularly to the drawings; consider Fig. 2, composed of the capacitor C and resistor R$a$ and R$b$ which make up a normal timing circuit. With the control circuit open, a step function applied to the input to represent the change of state of a multivibrator would result in an output having the form of Fig. 1.

Figure 3:
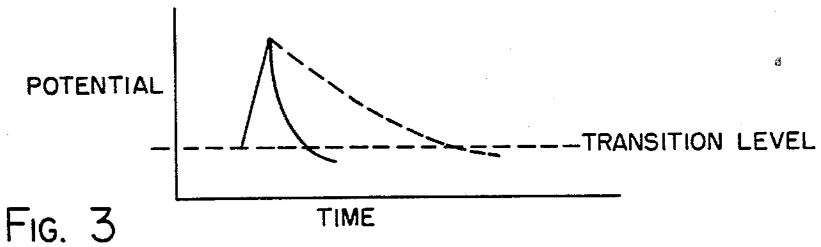
Fig. 3 is a graph similar to that of Fig. 1 showing the effect of the addition of the control circuit in the circuit of Fig. 2; and, Fig. 4 is a schematic diagram of a typical monostable multivibrator, having incorporated therein a control circuit in accordance with the invention.
Figure 4:
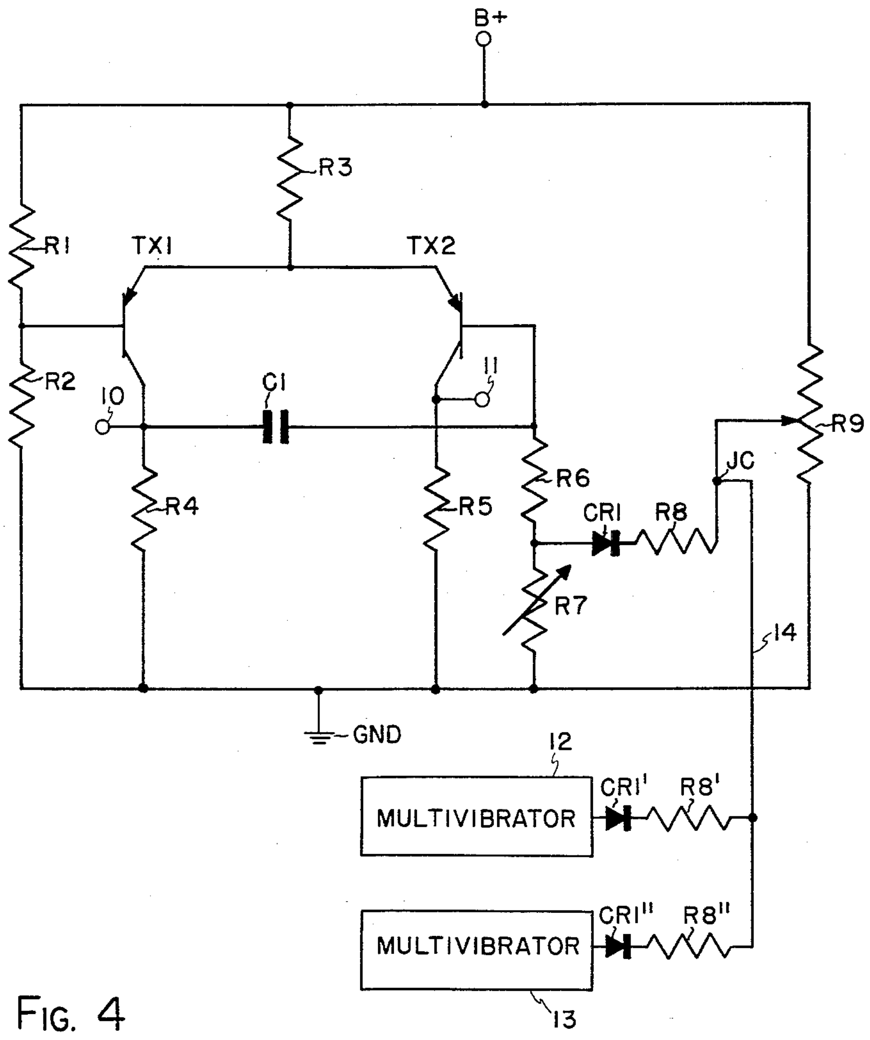

To this has been added, in accordance with the invention, a control circuit comprising the series arrangement of diode CR and resistor R$c$ connected between the junction of R$a$ and R$b$ and a positive terminal of a voltage source. When the control circuit is closed through a source of potential, the output may be unchanged, as represented by the dotted curve of Fig. 3, when the control potential equals or exceeds $$\frac{Rb}{Ra+Rb}$$

times the step function, or it may follow the solid curve when the control potential is zero and R$c$ is essentially in parallel with R$b$. As the control potential is varied between these limits, the output in response to a step function will trace intermediate curves intersecting a hypothetical transition level as shown by the dashed line at periods which increase smoothly with the control potential between the boundary curves. Current flows through R$c$ only as long as $$\frac{Rb}{Ra+Rb}$$

times the output exceeds the control potential, during which time it is proportioned to the excess over the control potential. Hence, a definite inflection in the output may be observed in some intermediate curves at the point where this current ceases, especially where $$Rc \ll \frac{RaRb}{Ra+Rb}$$

as illustrated in Fig. 4. Selection of the relative portions of the resistors will thus provide considerable manipulation of the relation between the timed period to a particular transition level and the control potential, without changing the boundary values or the operating levels of the multivibrator. Adjustment of the magnitude of the control potential will generally be necessary unless the relations are nearly linear.

Obviously there are many trivial variations available to a designer. For instance, Ra and Rc may be made essentially zero, Ra may be divided and transposed to provide suitable coupling, the amplifier may be one of the familiar two-stage forms customary in multivibrators or a single stage device such as a dynatron employing secondary emission, a point contact transistor with base resistance or a double-base diode, the amplifier may be current or potential responsive, the reactor may be an inductor, etc.

In Fig. 4 there is shown a monostable multivibrator circuit comprising a pair of transistors TX1 and TX2 having their emitters directly connected and connected by way of a resistor R3 to a positive terminal B+ of a voltage source. The base of TX1 is connected by a resistor R1 to B+ and by a resistor R2 to the negative terminal of the voltage source which is shown as the ground reference plane. The collector of TX1 is coupled by a capacitor C1 to the base of TX2 and connected by way of a resistor R4 to ground. Triggering input voltage is applied at a terminal 10 to the collector of transistor TX1 and is coupled to the base of transistor TX2 by capacitor C1. The collector of TX2 is connected to ground through a resistor R5 and to an output terminal 11. The base of TX2 is connected to ground through a serial arrangement of two resistors R6 and R7, the latter being variable.

The portion of the circuit which has been described is the same as that disclosed in U.S. patent application Serial No. 609,129, filed September 11, 1956, in the name of Robert R. Campbell and entitled "Monostable Multivibrator," and its operation is the same.

In the stable state of the circuit TX1 is cut off and TX2 is conducting to saturation. The conduction of TX2 causes a voltage drop across R3 which results in a base to emitter current flow in TX1 sufficient to maintain that transistor in its state of cut off. In this situation C1 will be charged, with the left hand terminal negative and the right hand terminal positive, charging through R3, R4 and the base to emitter resistance of TX2.

When a positive trigger is applied to the base electrode of TX2, a regenerative action occurs in which the application of the trigger to the base electrode results in a base to emitter current cutting off T2. The potential across R3 drops to a level which allows TX1 to conduct to saturation and the collector potential of TX1 goes more positive.

The voltage drop across R4, added to that across C1, causes the base of TX2 to be at a more positive potential than its emitter. This maintains TX2 in its cut off state. The collector of TX2 goes more negative and remains so until C1 discharges through R4 and R6, R7 sufficiently to allow TX2 to return to its original state of conduction. Variation of R7 will change the duration of the negative output pulses of the circuit.

To the circuit described above there is added, in accordance with the present invention, a network shunting the resistor R7 and comprising a series arrangement of diode CR1, resistor R8 and a direct current source of variable magnitude, which is shown as a resistor R9 connected across the power supply terminals. A movable tap on resistor R9 is connected to the resistor R8, the junction of these two elements being designated as JC.

The diode CR1 is so poled that it is cut off when its right hand terminal is more positive than the left hand terminal. The magnitude of the variable resistor R7 establishes the bias on TX2 and CR1 and sets the maximum pulsewidth of the multivibrator.

If the movable tap on R9 is in a position which makes the voltage at JC the same as that at B+, CR1 is biased off most of the time and the voltage change at the base of TX2 is slow. When this tap is so positioned that the voltage at JC is at ground level, the voltage change at the base of TX2 is rapid, since R7 is essentially shunted by R8.

The diode CR1 serves the purpose of preventing a positive biasing of the base of TX2 by the voltage at JC. A number of multivibrators may be simultaneously controlled through individual networks corresponding to CR1 and R8 connected to the junction JC. When so connected the diodes CR1 prevent the action of any of the connected multivibrators from generating spurious trigger pulses at the bases of transistors TX2 of the other multivibrators.

Additional multivibrators 12 and 13 are shown in the drawing, having networks CR1', R8' and CR1'', R8'' respectively, which are connected to the point JC by conductor 14.

What is claimed is:

1. A monostable multivibrator circuit having a cycle consisting of a stable state and an unstable state, said multivibrator comprising a pair of transistors connected as a two stage regeneratively coupled amplifier, means for applying triggering voltage to a first of said stages, capacitive means connected between said stages and coupling said triggering voltage to said second stage, a discharge circuit for said capacitive means including a fixed resistive means in series with a variable resistive means and providing a junction, a power supply source connected to said multivibrator and means in addition to said fixed and variable resistive means for controlling the duration of the unstable state output pulses of said multivibrator, the last named means comprising a variable resistive means being center tapped and directly connected across said power supply source to supply a variable direct voltage, a series arrangement of a diode and a resistor, said series arrangement being connected at one end to the center tap of said variable resistive means and being connected at the other end to the junction of said fixed and variable resistive means of said discharge circuit, said diode and said direct voltage being poled to maintain said diode conductive during a portion of said unstable state and non-conductive during the remaining portion of said cycle.

2. A plurality of monostable multivibrators, each comprising a pair of transistors connected as a two stage regeneratively coupled amplifier, means for applying triggering voltage to a first of said stages, capacitive means connected between said stages and coupling said triggering voltage to said second stage, a discharge circuit for said capacitive means including variable resistive means, a power supply source connected to said multivibrator and means shunting a portion of said variable resistive means and operable to control the duration of the output pulses of said multivibrator, the last named means comprising a serial arrangement of a diode, a resistor and a source of direct current of variable magnitude, the last named source being common to all said multivibrators.

3. A plurality of monostable multivibrators, each comprising a pair of transistors connected as a two stage regeneratively coupled amplifier, means for applying triggering voltage to a first of said stages, capacitive means connected between said stages and coupling said triggering voltage to said second stage, a discharge circuit for said capacitive means including variable resistive means, a power supply source connected to said multivibrator and means shunting a portion of said variable resistive means and operable to control the duration of the output pulses of said multivibrator, the last named means comprising a serial arrangement of a diode, a resistor and a source of direct current of variable magnitude, the last named source being common to all said multivibrators and comprising a potentiometer connected across said power supply source.

4. A monostable multivibrator having a cycle consisting of a stable state and an unstable state initiated by a trigger signal, said multivibrator comprising a pair of active devices, one normally conducting and one nonconducting during said stable state, means for regeneratively connecting said devices to alternate between conductive and non-conductive conditions as said multivibrator alternates between said states, a resistance-capacitance timing circuit including fixed and variable resistances in series connected between said devices to control the period of said unstable state, a power supply source connected to said multivibrator and means for altering said period comprising a tapped adjustable control voltage having its opposite ends directly connected across said power supply source and means including a diode coupling said tap of the adjustable voltage control and a junction point intermediate of said fixed and variable resistances of said timing circuit, said last named means and the adjustable voltage control being poled to maintain said diode conductive during a portion of said unstable state and non-conductive during the remaining portion of said cycle, said diode when conductive altering the time constant of said timing circuit.

References Cited in the file of this patent

UNITED STATES PATENTS

| | | |
|---|---|---|
| 2,405,843 | Moe | Aug. 13, 1946 |
| 2,641,717 | Toth | June 9, 1953 |
| 2,772,359 | Modiano | Nov. 27, 1956 |
| 2,827,574 | Schneider | Mar. 18, 1958 |